Aug. 30, 1966
J. A. NYLUND
3,269,065
SANDING APPARATUS
Filed Dec. 23. 1963
2 Sheets-Sheet 1
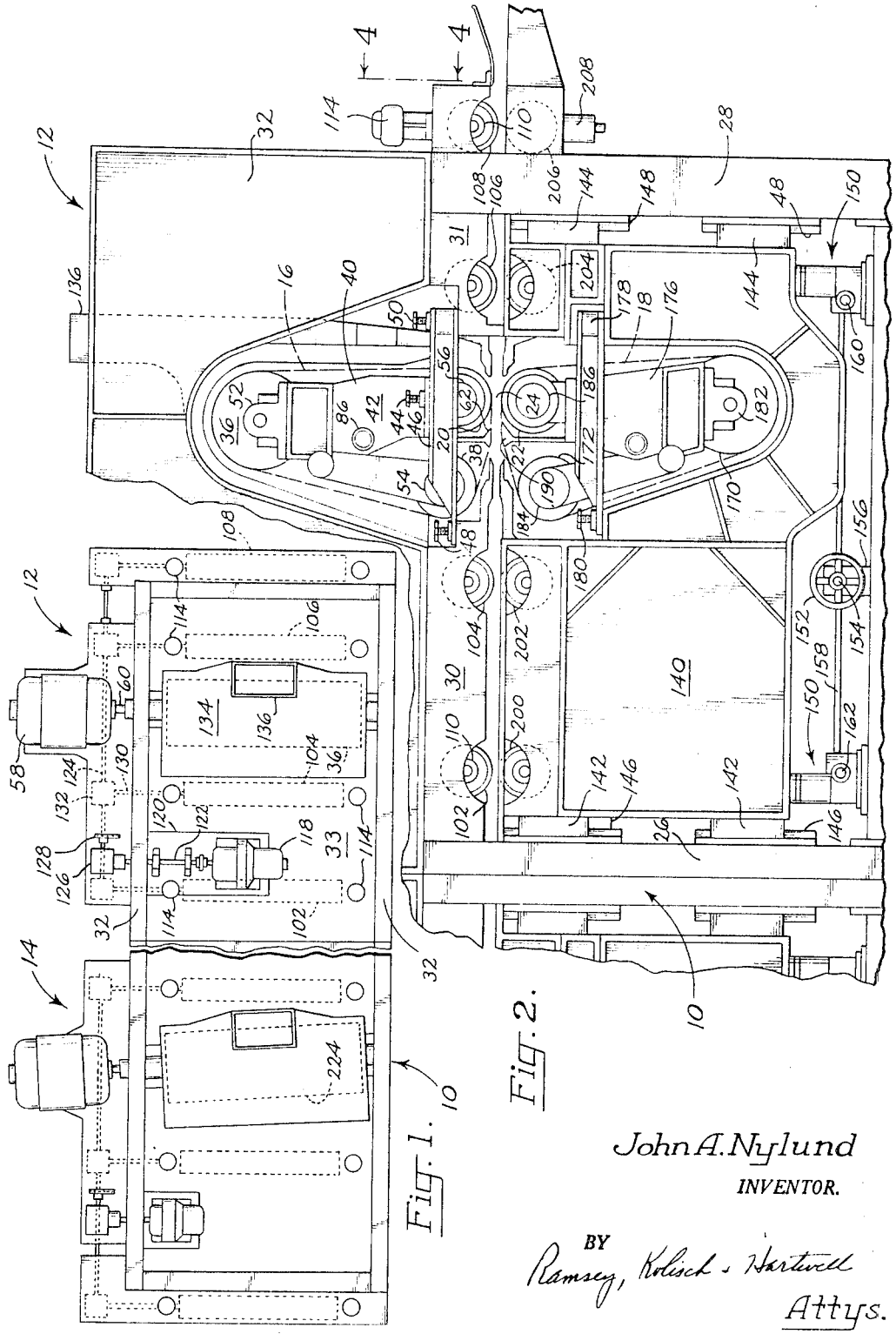
John A. Nylund
INVENTOR.
BY Ramsey, Kolisch & Hartwell
Attys.

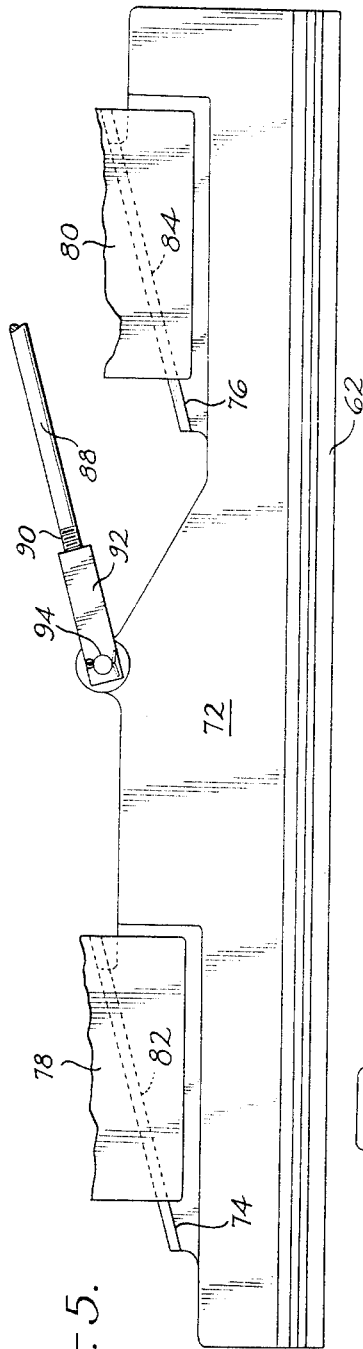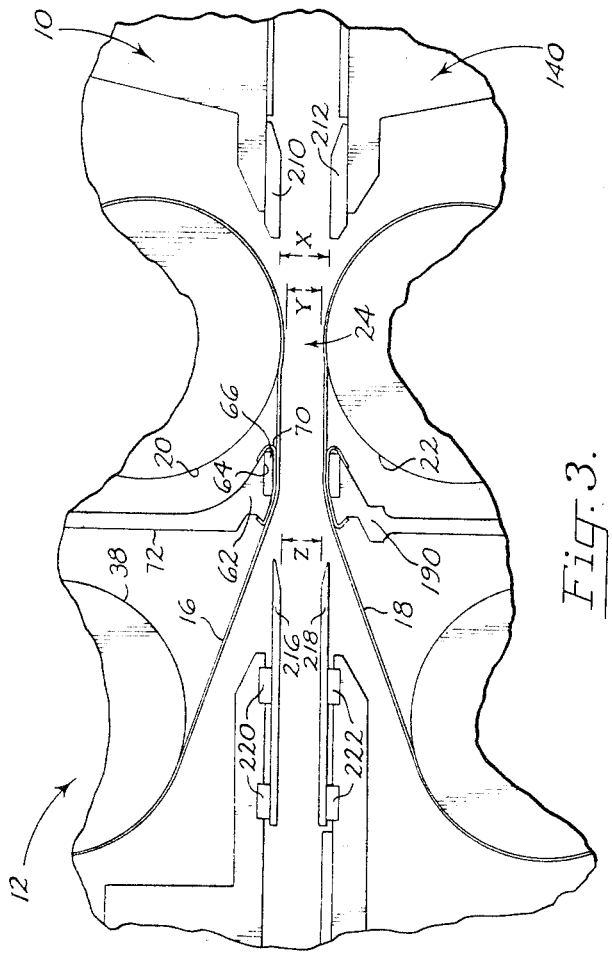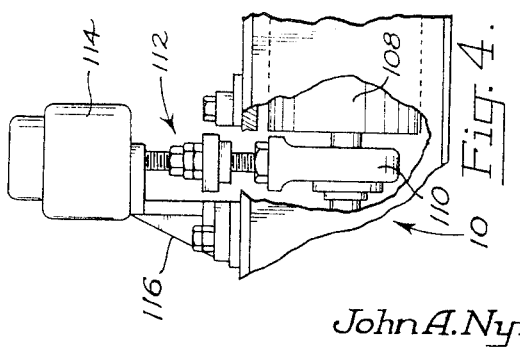

3,269,065
SANDING APPARATUS
John A. Nylund, Camas, Wash., assignor to Charles R.
Tidland and Arthur T. Williams, Camas, Wash.
Filed Dec. 23, 1963, Ser. No. 332,662
12 Claims. (Cl. 51—139)

This invention relates generally to sanding machines, and more particularly to such machines that utilize a wide endless sanding belt suitably trained over rollers and traveling at a high speed, to sand or otherwise smooth a generally flat surface of a workpiece fed through the machine.

An important object of this invention is to provide in such a machine or apparatus a pair of opposed, unyielding rollers, to apply opposed sanding belts under substantial pressure simultaneously to directly opposite portions of the opposed faces of a panel or other workpiece, said rollers being stacked vertically one over the other, and the feed of a workpiece between the rollers being along a plane which is perpendicular to the plane defined by the roller axes, whereby actual sanding of the panel or workpiece takes place along lines directly opposed to each other on the surfaces of the workpiece.

Another object of the invention is to provide a novel method of sanding, where sanding operations are performed simultaneously on directly opposed portions of a workpiece by opposed sanding belts, with each sanding belt providing a work-supporting surface for the other belt, such sanding operations taking place along lines extending in parallelism across the workpiece.

It is contemplated that the sanding machine or apparatus of this invention be employed to sand the opposite faces of such articles as boards, plywood panels, composition panels, veneers, etc. These items may be characterized as having relatively yielding and somewhat elastic surfaces, as opposed to articles such as metal sheets which are rigid throughout. Another characteristic of boards and panels is that their surfaces have zones distributed nonuniformly thereover of varying degrees of hardness and elasticity. In a plywood panel, for instance, where the face veneers of the panel are the surfaces being sanded, hard and soft spots, of nonuniform elasticity, are presented by reason of the presence in the face veneers of annular rings resulting from summer and winter growth in the wood. Knots and other irregularities also introduce nonuniformity to the surfaces sanded. In wood composition boards, such as particle boards, nonuniformity in surface elasticity and hardness results from the presence in the surfaces of the particle board of hard and soft wood particles interspersed with each other and resin deposits.

This invention is particularly adapted for dimensional sanding, in which sanding of a workpiece is performed during one continuous pass of the workpiece through the apparatus, which produces a workpiece having a uniform finally developed dimension (i.e., thickness) throughout. As contemplated herein, such dimensional sanding may be done with a single pair of opposed sanding belts, which produces a surfacing action on opposite faces simultaneously, but preferably plural sets of such sanding belts are utilized, with each set performing successive sanding operations on opposite workpiece faces. The initial sanding operation performed may be done using opposed belts having a relatively coarse grit, so that there is removal of substantial portions of the wood surfaces. This initial sanding operation may then be followed with successive sanding operations in which finer grits are utilized, whereby the board or panel may be finally smoothed to a predetermined finish.

In finishing an article such as a plywood panel, the final panel should have opposed surfaces which are smooth and absolutely plane, and should have a uniform thickness throughout its length and width. It has been noted that if the sanding operation is not performed on both sides of the panel simultaneously, and with the sanding on one side being in direct opposition to the sanding on the other, the panel surfaces will yield to varying degrees in localized zones under the sanding operation, and blemishes because of surface irregularities will remain, although the overall uniform thickness of the workpiece may be more or less maintained. In obtaining true smoothness, it is also important that substantial pressure be exerted upon the panel by the sanding belts working in opposition to each other, whereby the panel is over-compressed and thus somewhat thinner during the actual sanding than it is after its finished thickness has developed. It is also a requirement in obtaining optimum results that the sanding operations be performed by belts supported nonyieldably at a fixed spacing, whereby the space between the belts through which the panel travels on being sanded remains constant for the entire panel.

Further explaining, and considering the sanding of a plywood panel, there are several characteristics of the panel which must be taken into account if the best sanding results are to be obtained. For one thing, there is the inherent roughness of the panel faces present in all wood faces prior to sanding. There also may be waves or undulations over the expanses of the panel faces, resulting in thick and thin areas. Further, there will be minor variations in thickness in localized spots, due to the different types of wood making up the panel surfaces, i.e., hard winter or softer summer growth. These latter spots in addition to being uneven possess different degrees of compressibility and elasticity.

In a sanding operation in which both sides of a panel are not sanded simultaneously, there is no datum plane for determining the smoothness and depth of finish desired in the opposed faces of the panel. That is to say, if the opposed faces of the panel were to be sanded at 36 inch modular spacing, and not simultaneously, at that time when the first face to be sanded is sanded, the inherent roughness of the other, still unsanded face destroys the datum plane for this first sanding operation. After the first sanding, and before the sanding of the opposite face, the elasticity of the wood causes the sanded face to spring outwardly somewhat, and to a nonuniform extent over the expanse of the panel. This destroys any common datum plane for the second sanding. If both faces are sanded simultaneously, however, the peripheral surfaces of the rollers over which the sanding belts pass serve simultaneously as datum planes for the opposed sanding operation.

Experimental work has demonstrated that a substantial pressure, upwardly of 40 pounds of pressure per lineal inch, should be exerted on the panel during the sanding thereof. This results in a compression of the wood within the nip of the sanding belts, whereby during sanding the panel is somewhat thinner than it is when finished. Resistance to compression is greater in hard portions of wood than in soft wood portions. Soft portions of wood thus are compressed more easily, and as a consequence, with such substantial pressures used, a major portion of the sanding action which takes place occurs in sanding down hard portions of the wood surface to proper height. This tends to balance out the eventual panel, because the soft wood is not over-gouged away, as it tends to be when low pressures are used, as such soft portions yield away from the sanding belt. When a panel sanded as contemplated leaves the sanding zone, the soft wood portions spring back to align themselves to the sanded hard wood portions which have less elasticity. The result is a completely smooth sanded panel.

With belts nonyieldably maintained a fixed predetermined distance apart during such a high pressure, simultaneous sanding operation, all hard wood portions are sanded down to a truly uniform plane on both faces of the panel. Sanded panels, therefore, may be produced which are not only smooth, but also have a truly uniform thickness.

It is to be noted that the method of the invention differs somewhat from prior recognized techniques. Formerly it has been considered necessary to provide some yield in the application of sanding belts against surfaces to be sanded. Further, high pressures during sanding have not been used in belts working on opposite surfaces as contemplated. The yield formerly provided for was thought necessary to assure that the belt did not slip on the rollers over which it traveled. It has heretofore been considered impractical to perform dimensional sanding simultaneously with belt sanders.

Sanding operations are expensive and time consuming, and both of these factors must be reduced to a minimum under competitive commercial operations. Experience has demonstrated that in the practice of this invention drum sanders are not economically practical, because of the elevated pressures utilized during the sanding operation. These pressures result in rapid deterioration of the abrasive surfaces in drum-type sanders. The invention thus is limited to belt sanders, where the effective length and thus area of the sanding belt is substantial, and many times in excess of the circumferential area of any roller over which the belt travels.

A further feature of the invention is the provision of a sanding machine as above generally described which includes means for polishing both faces of a workpiece immediately after the same is sanded. This polishing is the result of resiliently pressing the opposed sanding belts against the opposed surfaces of a workpiece, with a slight pressure, in a zone immediately following the zone where actual sanding takes place. With this organization, polishing is performed by the same means that produces the sanding. The polishing is done with the workpiece held in the plane determined by the nip of the rollers and belts in the sanding zone, so that again the datum planes defined in this zone are utilized to obtain the exact type of polishing desired. Because polishing is done with light resilient pressure, surfaces polished are relaxed somewhat during polishing. It will be noted, of course, that the use of sanding belts, as opposed to drum sanders, is important in providing for this polishing action, since it is the abrasive agents that produce the sanding that are also used to produce the polishing and this is only possible with sanding belts that may be trained so as to extend in a tangential direction from the zone where sanding occurs.

It has been determined that it is desirable to divide the sanding operation into two or three parts, in which sanding belts having different grits are utilized in successive sanding stations. Thus the work load may be distributed. For example, an initial pair of opposed rollers training sanding belts may be utilized to cut the faces of a panel down approximately to the eventual finish or datum planes desired. A succeeding pair of rollers with belts may be used to cut out lateral ridges between grooves. A third pair of rollers and belts may be desirable, for the purpose of producing an even finer finish. In this connection, where separate finishing rollers and belts are provided, preferably the rollers are inclined slightly from a position extending directly across or perpendicular to the center line of the machine. This results in the sanding belts which travel over the rollers being wiped across the surfaces being sanded at an acute angle relative to the direction that a workpiece moves. This eliminates any tendency for minute irregularities in a sanding belt to travel continually in the same path over a sanded surface, thus to produce slight scoring in said surface.

A further object of this invention comprises providing sanding apparatus of a type contemplated, which is adjustable in a novel manner, to provide for the sanding of panels and other articles of different thicknesses.

Yet another object is to provide sanding apparatus including novel means for feeding panels or other workpieces through the apparatus, with such traveling in a plane which bisects successive sanding zones disposed as a series, as described. A panel being sanded in the apparatus contemplated is firmly held at all times in regions disposed to the sides of the zones where sanding occurs. The panel is always accurately positioned with respect to the sanding belts, whereby any tendency of the belts to snip off the ends of a panel is eliminated.

Other objects and advantages are attained by the invention, and the same is described hereinbelow in conjunction with the accompanying drawings, wherein:

FIG. 1 is a plan view of sanding apparatus constructed according to the invention, such apparatus including plural sanding stations spaced along the length thereof;

FIG. 2 is a side elevation of portions of the apparatus illustrated in FIG. 1, drawn on a slightly larger scale, and showing details of one sanding station;

FIG. 3 is a side elevation, drawn on an even larger scale, showing parts in a sanding zone defined in a sanding station of the apparatus, and how these parts produce sanding of a panel on such passing through the sanding zone, the drawing being somewhat exaggerated for explanation purposes;

FIG. 4 is a view taken along the line 4—4 in FIG. 2, drawn on a larger scale than FIG. 2, showing how a clamping roll in the apparatus is mounted; and FIG. 5 illustrates a polishing shoe or bar in a sanding station, and the mounting thereof in the apparatus.

Referring now to the drawings for a more detailed description of apparatus according to the invention, and first of all more particularly to FIGS. 1 and 2, the apparatus illustrated comprises a frame, indicated generally at 10, having plural sanding stations provided thereon at points located along the length of said frame. In these stations, successive sanding operations may be performed on a workpiece, such as a plywood panel. In FIG. 1, two of such sanding stations are shown, and these are indicated at 12 and 14. Station 12 is adjacent the free end of the apparatus, and this is the station that performs the initial sanding operation. Station 14 is adjacent the off-bearing end of the apparatus, and constitutes a finishing station where finishing sanding is performed. The apparatus may comprise a greater number of sanding stations than the two shown. Thus, in FIG. 1, the apparatus is shown with portions thereof between its ends removed. Any stations provided may resemble the two sanding stations illustrated, and thus illustration and description of such additional stations is not considered necessary for an understanding of the invention.

For the most part, the various sanding stations provided in the apparatus are similar in construction. Thus only one, namely, station 12, is described in detail.

In each station, sanding operations may be performed simultaneously, on directly opposite face portions of a panel, by a pair of wide, endless sanding belts, such as those shown at 16 and 18. These belts travel over opposed, unyielding rollers exemplified by rollers 20 and 22 in station 12. Rollers 20, 22 are horizontal, their axes are vertically aligned, and where belts 16, 18 pass over the rollers at their closest point (the nip of the rollers), a sanding zone 24 is defined.

In each sanding station, frame 10 includes, on each side of the apparatus, a pair of uprights 26, 28. These are supported by the ground. On each side of the apparatus, and extending horizontally, inwardly and toward each other from adjacent the tops of uprights 26, 28, are beam sections 30, 31. Suitably secured to these beam sections, and extending vertically upwardly therefrom on each side of the apparatus in a side panel 32. The uprights, beam sections, and side panel on one side of the apparatus are suitably interbraced with the uprights, beam sections, and side panel on the other side of the apparatus, whereby a completely rigid, box-like frame is formed. Top plate 33 is shown in FIG. 1, which is mounted on beam sections 30, 31, and extends horizontally between them.

Sanding belt 16 which sands the top face of a panel or workpiece in the sanding station, is trained over a drum 36, and a roller 38, in addition to roller 20 already discussed. On each side of the machine, rollers 20, 38 and drum 36 are mounted on a frame section 40, which includes a standard 42, and a base 46, secured together as by hand screw 44. On each side of the machine, base 46 is secured at its ends, by hand screws 48, 50, to beam sections 30, 31. Thus, each frame section 40 is fixed in place on frame 10. The rollers and drum are journaled on frame section 40, by a bearing 52 mounted on the standard of the frame section in the case of drum 36, a bearing 54 mounted adjacent one end of base 46 in the case of roller 38, and a bearing 56 mounted on an intermediate portion of base 46 in the case of roller 20.

During operation of the sanding apparatus, sanding belt 16 is moved at a fairly rapid speed, with the portion thereof that travels over roller 20 moving to the right in FIG. 2, or against the feed direction of panels, which is from right to left in FIG. 2. Typically the belt may be moved at speeds ranging from 6,000 to 7,000 feet per minute. Such movement of the belt is produced by rotating drum 36 under power, in a counterclockwise direction in FIG. 2, by electric motor 58 (see FIG. 1). Motor 58 is suitably mounted on frame 10 adjacent one side of the apparatus, and includes an output shaft 60 connected to drum 36 whereby on energizing of the motor, the drum is rotated.

During sanding of a panel, bearings 54, 56 which mount the ends of rollers 20, 38 on each side of the apparatus are stationary, which is to say they have a fixed position on frame section 40 and frame 10. Rollers 20, 38 are steel-surfaced, and thus have rigid peripheries. It follows that in sanding zone 24, where belt 16 passes over roller 20, the belt is unyieldingly supported or backed up by the roller, and the bottommost portion of the belt remains at a fixed elevation. This unyielding support rendered by roller 20 is an important part of the invention, as it has been found to promote the production of smooth-surfaced panels of uniform thickness.

While rollers 20, 36 have been described as having axes which are fixed during sanding periods, it should be understood that in some installations adjustments in the positions of these rollers may be desirable preparatory to sanding. Thus, it may be desirable to adjust roller 20, for instance, to different heights, to adapt the machine to different types of sanding belts, or to adjust roller 38, to produce proper tension in a sanding belt, and proper travel of the belt over the rollers and drum. A full description of adjustment mechanism which may be included for those purposes is not contained herein, as it is thought that such would only unduly complicate the description of the invention. It should be understood, however, that by employing the term fixed, or stationary, with respect to the roller axes, such refers to the condition of the roller axes during sanding periods, and is not intended to exclude the fact that the rollers may be adjustable during nonoperating periods.

Referring to FIG. 2, and in conjuction with this figure, FIGS. 3 and 5, bearing against sanding belt 16, between roller 38 and roller 20, is an elongated, transversely extending pressure bar or shoe 62. Along the base of the bar, a recessed portion 64 is provided, and within this recessed portion there is mounted an elongated resilient pad 66. A low coefficient of friction covering 70 extends over pad 66 and the base of shoe 62, and it is this covering which actually slides against the inner surface of the sanding belt as the sanding belt travels past the pressure bar. The function of the pressure bar is to apply the sanding belt with resilient and light pressure against the face of a workpiece after the same is sanded, in a zone directly after sanding zone 24, whereby a polishing action is imparted to the panel.

The pressure bar is joined to an upstanding plate portion 72. Integral with plate portion 72, and adjacent opposite ends of the plate portion, are elongated flanges, extending at right angles to the body of the plate portion, and shown in FIG. 5 at 74, 76. The pressure bar is stationary during sanding periods, and mounting the bar in this stationary position are mountings 78, 80 which are suitably rigidly secured to frame sections 78, 80 adjacent opposite sides of the apparatus. These mountings include elongated inclined guide slots 82, 84 which receive flanges 74, 76 of the pressure bar.

Again, as in the case of rollers 20, 38, while the pressure bar is stationary during sanding periods, some adjustment in its elevation may at times be desirable when setting the machine up, as for example, when it is desired to adjust the polishing pressure exerted by the bar. Adjustment in the vertical position of the bar is accomplished by shifting the bar to the right or left in FIG. 5, which has the effect of also raising or lowering the bar, as the case may be, due to the incline illustrated in FIG. 5 of the flanges and guide slots. Longitudinal shifting of the bar is accomplished by a hand wheel 86 (see FIG. 2) which is connected to a shaft 88 (see FIG. 5). Shaft 88 has a threaded end 90 received within an internally threaded socket 92 pivotally mounted on plate portion 72, at 94. From this, it should be apparent that upon turning the handle, the shaft also is rotated, causing socket 92 to advance onto or back off of the end of the shaft, with such producing in turn longitudinal and vertical movement of plate portion 72 and the guide bar.

A workpiece such as a panel is transported through the sanding station along a path which extends perpendicularly to the vertical plane defined by the axes of rollers 20, 22. Defining the top of this path, and contacting the upper face of the workpiece being processed, are rubber-surfaced clamping rolls, shown at 102, 104, 106 and 108. These rolls are journaled at their ends, in bearings, such as bearing 110.

As best shown in connection with the bearing 110 illustrated for roll 108 in FIG. 2, and also referring to FIG. 4, each bearing is secured to the base of an upwardly extending link structure 112, which projects downwardly out of an extensible-contractible diaphragm cylinder 114. The diaphragm cylinder is mounted as by bracket 116 on frame 10 of the apparatus. Upon actuation of the diaphragm cylinder, the link structure may be shifted vertically relative to frame 10, which results in the bearing being shifted vertically. This adjustment is made to change the clamping pressure exerted by one end of a roll in a workpiece.

Rolls 106, 108 are spaced less than the length of a workpiece apart, and similarly, rolls 102, 104 are spaced less than the length of a workpiece apart. Further, rolls 104, 106, which are on either side of sanding zone 24, are spaced apart a distance which is less than the length of a workpiece. Thus, on a panel or other workpiece traveling through the apparatus, while any portion of such panel is in sanding zone 24, the panel at all times is contacted by at least two clamping rolls. With this organization, a firm grip on the top face of the panel is assured. This is important, since it should be remembered that the panel is advanced against the countermoving sanding belt, which normally is forced with considerable pressure against the top of the workpiece. The provision of rolls as indicated also means that an upper support plane is at all times defined for any workpiece passing through the sanding zone.

Rolls 102, 104, 106, 108 are rotated in a clockwise direction in FIG. 2, by means of a motor, such as electric motor 118 shown in FIG. 1. Motor 118 is mounted on a pad 120, fastened to plate 33 extending over the top of the apparatus. Output shaft 122 of the motor is connected to a drive shaft 124 for the rollers, through a gear box 126 and chain 128. Each of the rolls includes a roll shaft 130, which is driven by drive shaft 124 through gear boxes, such as gear box 132.

As best seen in FIG. 1, a hood 134 mounted on plate 33 is provided, which extends over the top of sanding belt where it extends about drum 36. This hood is joined to a duct 136 extending upwardly from drum 36. The hood and duct are included for the purpose of withdrawing sawdust and other material which is loosened during the sanding operation.

Each sanding station includes structure similar to that just described, whereby belt 18 which sands the bottom surface of a workpiece is properly mounted to move through the sanding zone, and whereby a panel is supported as the same moves through said zone. Reference is again made to FIG. 2, where this structure is illustrated.

As seen in FIG. 2, on each side of the apparatus, and extending between uprights 26, 28, is a side panel 140. Secured to opposite side margins of a side panel 140, adjacent the top and bottom thereof, are guide shoes 142, 144. These guide shoes are vertically movable on rails 146, 148 fastened to uprights 26, 28, respectively.

Opposite margins of the panel on each side of the apparatus are moved up and down by means of worm gear operated jacks, such as those shown generally at 150. All the jacks supporting the side panels may be extended or retracted in unison, by a hand wheel 152. Hand wheel 152 is connected to a shaft 154, which is connected through a gear box 156 to a longitudinally extending shaft 158. Shaft 158 at one end is connected for driving purposes to a transverse shaft 160, which when turned actuates the worm gear operated jacks 150 for the two side panels 140 adjacent the feed end of the machine. Shaft 158 is operatively connected for driving purposes at its other end to a transverse shaft 162, which is operatively connected to the worm gear operated jacks on the off-bearing end of the sanding station.

With the structure described, the side panels, also referred to herein collectively as a subframe, are moved up and down in unison, to position properly the means that supports the underside of a panel or workpiece during the sanding thereof, and the means that produces sanding of the underside, as will now be described in more detail.

Sanding belt 18 and roller 22 have already been mentioned briefly. Belt 18, in addition to traveling over roller 22, travels over a drum 170, and a roller 172. Roller 22, drum 170 and roller 172 have ends on each side of the apparatus supported on a frame section 176, similar in construction to frame sections 40 already described. A frame section 176 is fixedly mounted on a side panel 140 on each side of the apparatus by a hand screw 180 and a fastening assembly 178.

As in the case of upper sanding belt 16, the drum and rollers that train the lower sanding belt 18 are journaled on frame sections 176, by means of bearings, such as those illustrated at 182, 184 and 186. These bearings during sanding periods are stationary, which is to say that they have a fixed position relative to the frame sections upon which they are mounted.

The drum and rollers training the lower sanding belt are steel-surfaced and thus have rigid peripheries. As a consequence, and since the axis of roller 22 is stationary during sanding periods, belt 18, where it passes over the top of roller 22, remains at a fixed elevation. With belt 16 at a fixed elevation where it passes over the bottom of roller 20, this means that the width of sanding zone 24 remains constant during sanding periods.

Between roller 22 and roller 172 is an elongated, transversely extending pressure bar or shoe 190. This shoe performs a polishing action similar to the polishing action performed by shoe 62, and like shoe 62 remains stationary during sanding periods. The shoe may be mounted similarly to upper shoe 62, whereby vertical adjustment is accommodated.

Suitably journaled on side panels 140 on either side of the machine are rolls 200, 202, 204, 206. One of these rolls is disposed directly beneath one of the rolls 102, 104, 106, 108. Rolls 200, 202, 204 and 206 also are rubber-surfaced, and function to support the bottom face of a panel or workpiece traveling through the machine. As best illustrated by roll 206, the end of each roll may be journaled in an extensible assembly 208, which accommodates vertically adjusting the position of the end of the roll.

Drum 170 is rotated under power in a clockwise direction in FIG. 2, to move the sanding belt trained thereover against the bottom face of the workpiece, as the workpiece is advanced thereinto. Rolls 200, 202, 204, 206 are rotated under power in a counterclockwise direction, to feed a panel from right to left, whereby it is advanced through sanding zone 24. The driving means provided for drum 170 and the rolls is similar to the driving means illustrated and described for top drum 36 and rolls 102, 104, 106, 108 and thus has not been illustrated in the drawings.

Completing the description of sanding station 12, and referring to FIG. 3, directly on the feed side of rollers 20, 22, and thus the feed side of the sanding zone, are a pair of guide elements 210, 212. Upper guide element 210, which is an elongated member with a smooth bottom surface extending transversely of the machine, has its ends mounted in a fixed position on frame 10. Lower guide element 212, which is an elongated member with a smooth top surface, is mounted in a fixed position on the subframe or side panels 140. These guide elements define a channel through which a workpiece travels on passing into the sanding zone, and function accurately to guide a panel immediately prior to its entrance into the sanding zone, and to support the panel to prevent it from chattering, etc.

Still referring to FIG. 3, directly on the off-bearing side of the sanding zone, and polishing zone provided by the pressure bars or shoes, are guide elements 216, 218. Upper guide element 216 is mounted through resilient pads 220 on frame 10. Lower guide element 218 is mounted through resilient pads 222 on subframe 140. These guide elements also define a channel through which a workpiece travels, and serve to guide a workpiece immediately upon its leaving the sanding zone, and prevent chatter therein.

The sanding apparatus, as already indicated, may comprise plural sanding stations including such a sanding station as station 14 adjacent the off-bearing end of the apparatus where finishing sanding is performed. Sanding station 14 in all material respects may be similar to the sanding station just described. Thus the station includes upper and lower sanding belts, which travel over back-up rollers providing unyielding support for these belts in a sanding zone of fixed width. The station further includes clamping rolls on the feed and off-bearing sides of the sanding zone which function to transport and support a workpiece while the same is sanded, with such workpiece in a horizontal plane which is perpendicular to the vertical plane defined by the axes of the rollers that back up the sanding belts.

The principal difference between the sanding station which produces finishing sanding (station 14) and the one just described (station 12), resides in the angular position of the sanding belts with respect to the path of work fed through the apparatus, and this will now be described in more detail.

It will be noted in FIG. 1 that a drum 224 is indicated, which corresponds to drum 36 of station 12. This drum, as in the case of drum 36 of station 12, is above and vertically aligned with the roller that backs up the sanding belt in the sanding zone for the station. This back-up roller for the sanding belt is not illustrated, but it will be obvious from what has been said that the roller has the same angular position with respect to the longitudinal axis of the apparatus (or the direction of travel of work) as does drum 224. In FIG. 1, drum 224 is shown inclined slightly (in the neighborhood of 4°) from a position exactly perpendicular to the line of travel for work. This inclination in the drum, which is also present in the back-up roller for the sanding belt in the sanding zone for the station, produces a wiping action in the sanding belt whereby it moves slightly in a lateral direction over a workpiece. This is desirable in the final sanding station, as it has the effect of producing a smoother finished product completely free of any scoring, such as might result were the belt to be moved across the workpiece in a direction exactly paralleling the movement of the workpiece.

In the sanding apparatus contemplated, it has been pointed out that the rollers over which the belts travel in a sanding zone are nonyieldably supported, whereby the belts in the sanding zone remain a fixed distance apart. Further, the rollers and belts are positioned relative to each other whereby a substantial pressure may be exerted on the workpiece in the sanding zone, ranging from 30 to 40 pounds per lineal inch. Such a substantial pressure, and the fact that both surfaces of a workpiece are sanded simultaneously, along directly opposed lines of parallelism, coupled with the fact that the belts in the sanding zone are maintained at a fixed relative spacing, have been found to produce superior sanded products, by reason of the sanding action which will now be described. Reference is now made again to FIG. 3, where the parts of a sanding zone in a station are illustrated (it being understood that some exaggeration has been made in FIG. 3 for reasons of clarity).

A workpiece such as a plywood panel upon entering sanding zone 24 may include general unevenness in the form of waves or undulations extending over the surfaces of the panel. The panel also over its opposite faces possesses the usual inherent roughness which it is desired to remove. With plywood panels, hard and soft spots, of different degrees of elasticity are nonuniformly distributed over the opposite faces thereof. Such a panel may have an average overall thickness corresponding to the distance indicated at X in FIG. 3 between guide elements 210, 212.

Upon passing through sanding zone 24, the panel throughout its length is reduced to a uniform thickness, determined by the distance between the sanding belts where they pass over rollers 20, 22, such corresponding to the distance indicated at Y in FIG. 3. Overall unevenness in the panel is removed in the sanding zone. Because of the substantial pressure exerted by the belts in the sanding zone, the panel in the sanding zone in addition to having material removed from its faces is compressed to a thickness which is somewhat less than its ultimate thickness. Hard, relatively unelastic spots distributed over the faces of the panel are subjected to the major sanding action. Soft, more elastic portions are sanded with lighter pressure. Any tendency for these soft, more elastic portions to be gouged out below the plane of the hard portions, as noted in usual sanding operations, is eliminated.

With both sides sanded simultaneously, the smoothness and depth of finish performed by upper belt 16 is determined by the datum plane defined by the lower belt 18. Further, the smoothness and depth of finish of the lower belt 18 is determined by the datum plane defined by the upper belt 16. Each belt therefore performs the sanding operation desired, with respect to a fixed plane defined on the other side of the panel by the other belt.

Upon the panel leaving the sanding zone, some expansion occurs in the panel, upon relaxation of the pressure exerted thereon, although the panel does not immediately assume full sanded thickness. The polishing shoes immediately after sanding zone 24 urge the sanding belts against opposite faces, along areas that again are directly opposite, and opposite faces are polished with respect to the datum planes established by the sanding belts in the sanding zone. During the polishing of the faces the panel may have a thickness such as that indicated at Z, which is somewhat greater than the thickness Y, but substantially less than the original thickness. Upon leaving the sanding station, and after a perceptible period of time, the panel fully assumes its final thickness.

The panel, on entering into sanding zone 24, has its opposite faces clamped between opposed clamp rolls 108, 206, and opposed clamp rolls 106, 204. The panel on leaving the sanding station has its opposite faces clamped between rolls 104, 202, and rolls 102, 200. These various pairs of clamp rolls, which constitute work-transporting means in the apparatus, are spaced from each other so that while sanding is actually performed, the panel is at all times held by at least two pairs of clamp rolls. The various pairs of clamp rolls define a path of travel extending through the sanding zone, which is perpendicular to the vertical plane defined by the axes of rollers 20, 22. The path of travel defined by these clamp rolls is such that a panel or other workpiece traveling therealong is supported so that a plane bisecting the workpiece between its opposite faces also bisects the space between the belts in sanding zone 24. Guide elements 210, 212, on the feed side of the apparatus, and guide elements 216, 218 on the off-bearing side, cooperate with the clamp rolls in defining this path.

Diaphragm cylinders 114 have been described, which may be actuated to shift the ends of the upper clamp rolls vertically. Such an adjustment is important in obtaining proper flow direction in a workpiece traveling through the apparatus. Thus, if there has been a tendency noted for a workpiece to veer toward the right on passing through the apparatus, one or more of the diaphragm cylinders which are connected to the right set of ends of these clamp rolls may be adjusted to bring these right set of ends closer to the lower clamp rolls which support the base of the work. As a consequence, the workpiece along its right margin will have a greater clamping pressure exerted thereon, and the workpiece will be urged forwardly more positively along its right margin, against the resistance to movement offered by the sanding belts which are moving against the flow of work. This will tend to straighten out the veering tendency formerly noted. A slight relaxation of clamping pressure exerted on the left margin of the workpiece will produce a similar straightening.

The apparatus described has been found to produce superior, smooth-surfaced panels, boards and like products, of uniform thickness throughout. Sanding may be performed rapidly, with a minimum amount of supervision of the machine or apparatus required.

It is claimed and desired to secure by Letters Patent:

1. A method of sanding a nonmetallic workpiece having opposed yielding and elastic surfaces of varying degrees of hardness in zones nonuniformly distributed over the surfaces, the method comprising passing said workpiece between a pair of endless traveling sanding belts, where said belts have runs disposed opposite each other that converge on each other and that define a sanding zone for the workpiece in a region where the belt runs come the closest to each other, sanding both of said opposed surfaces simultaneously with said belt runs in said sanding zone, whereby each belt run in the sanding zone defines a datum plane for the depth and smoothness of finish produced by the belt run opposite, compressing the yielding and elastic surfaces of said workpiece in said sanding zone with said opposed runs, whereby the workpiece in said zone has under compression a dimension between its said opposed surfaces which is less than the finally developed dimension between said surfaces, and fixing the spacing between the belt runs in said sanding zone, during the compressing and sanding of the workpiece, whereby the workpiece has under compression a dimension between its said opposed surfaces which is uniform throughout the expanse of the workpiece treated.

2. A method of sanding a nonmetallic workpiece having opposed yielding and elastic surfaces of varying degrees of hardness in zones nonuniformly distributed over the surfaces, the method comprising passing said workpiece between a pair of endless traveling sanding belts, where said belts have runs disposed opposite each other that converge on each other and that define a sanding zone for the workpiece in a region where the belt runs come the closest to each other, sanding both of the opposed surfaces simultaneously with said belt runs in said sanding zone, whereby each belt run defines a datum plane for the depth and smoothness of finish produced by the belt run opposite, compressing the yielding and elastic surfaces of the workpiece in said sanding zone with said opposed runs, whereby the workpiece in said zone has under compression a dimension between its opposed surfaces which is less than the finally developed dimension between said surfaces, fixing the spacing between the belt runs in said sanding zone, during the compressing and sanding of the workpiece, whereby the workpiece has under compression a dimension between its said opposed surfaces which is uniform throughout the expanse of the workpiece treated, and polishing said opposed surfaces upon said workpiece leaving said sanding zone, by resiliently pressing portions of said opposed belt runs against said surfaces, in a polishing zone located immediately on the off-bearing side of said sanding zone, said belt runs in said polishing zone exerting equal pressures on said opposed surfaces when spaced at equal distances from the datum planes defined in said sanding zone by opposite belt runs.

3. A method of sanding a nonmetallic workpiece having opposed yielding and elastic surfaces of varying degrees of hardness in zones nonuniformly distributed over the surfaces, the method comprising feeding said workpiece between a pair of endless traveling sanding belts, where said belts have runs disposed opposite each other that converge on each other and that define a sanding zone for the workpiece in a region where the belt runs come the closest to each other.

sanding both of the opposed surfaces simultaneously with said belt runs in said sanding zone, whereby each belt run defines a datum plane for the depth and smoothness of finish produced by the belt run opposite, compressing the yielding and elastic surfaces of the workpiece in said sanding zone with said opposed runs, whereby the workpiece has a dimension under compression in said zone between its said opposed surfaces which is less than the finally developed dimension between said surfaces, and fixing the spacing between the belt runs in said sanding zone, during the compressing and sanding of the workpiece, whereby the workpiece has under compression a dimension between its said opposed surfaces which is uniform through the expanse of the workpiece treated.

said feeding of the workpiece between said sanding belts being performed along a path which parallels tangents to said belts at their closest point, and with the center line of the workpiece located so that on movement of the workpiece its center line moves along a plane disposed midway between said datum planes.

4. A method of sanding the faces of wooded flat-faced panels, boards and the like, said panels having opposed yielding and elastic surfaces forming the faces thereof of varying degrees of hardness in zones distributed nonuniformly over the surfaces, the method comprising feeding the panel between a pair of endless traveling sanding belts, where said belts have runs disposed opposite each other that converge on each other and that define a sanding zone for the panel in a region where the belt runs come the closest to each other, sanding both of the opposed faces of the panel simultaneously, with said belt runs in said sanding zone, whereby each belt run defines a datum plane for the depth and smoothness of finish produced by the belt run opposite, compressing the panel in said sanding zone, with said opposed runs, whereby the panel has a thickness under compression in said zone which is less than the finally developed thickness in the panel, and fixing the spacing between the belt runs in said sanding zone, during the compressing and sanding of the panel, whereby the panel has a thickness on passing through the sanding zone which is uniform throughout the length of the panel, said feeding of the panel between said sanding belts being performed along a path which parallels said tangents to said belts in said sanding zone, and with the center line of the panel located whereby on movement of the panel its center line moves along a plane disposed midway between said datum planes.

5. A method of sanding the faces of wooded flat-faced panels, boards and the like, said panels having opposed yielding and elastic surfaces forming the faces thereof of varying degrees of hardness in zones distributed nonuniformly over the surfaces, the method comprising feeding the panel between a pair of endless traveling sanding belts, where said belts have runs disposed opposite each other that converge on each other and that define a sanding zone for the panel in a region where the belt runs come the closest to each other, sanding both of the opposed faces of the panel simultaneously, with said belt runs in said sanding zone, whereby each belt run defines a datum plane for the depth and smoothness of finish produced by the belt run opposite, compressing the panel in said sanding zone, with said opposed runs, whereby the panel has a thickness under compression in said zone which is less than the finally developed thickness in the panel, fixing the spacing between the belt runs in said sanding zone, during the compressing and sanding of the panel, whereby the panel has a thickness on passing through the sanding zone which is uniform throughout the length of the panel, said feeding of the panel between said sanding belts being performed along a path which parallels said tangents to said belts in said sanding zone, and with the center line of the panel located whereby on movement of the panel its center line moves along a plane disposed midway between said datum planes, and polishing said opposed faces of the panel upon the panel leaving said sanding zone by resiliently pressing portions of said opposed belt runs against said faces in a polishing zone located immediately on the off-bearing side of said sanding zone.

6. A dimensional sanding apparatus for nonmetallic workpieces comprising a frame, a pair of substantially horizontal rollers, rigid peripheries for the rollers centered about the axes for the rollers, means mounting the rollers on said frame with one directly above the other, said means mounting said rollers supporting the rollers with their axes a fixed distance apart and with the peripheries of the rollers in spaced relationship, and an endless belt trained over each of said rollers, said rollers providing nonyielding backing for the two belts in a zone located between the rollers which constitutes a dimensional sizing and sanding zone in the apparatus.

7. Dimensional sanding apparatus for a nonmetallic workpiece comprising a frame, a pair of substantially horizontal and parallel rollers, said rollers having rigid peripheries centered about the axes for the rollers, means mounting said rollers on said frame with one above the other and the axes of the rollers in a vertical plane, said means mounting said rollers supporting the rollers with their axes a fixed distance apart and with the peripheries of the rollers in spaced relationship, an endless sanding belt trained over each of the rollers, said rollers providing nonyielding backing for the two belts in a zone located between the rollers which constitutes a dimensional sizing and sanding zone in the apparatus, and work-transporting means on the feed and off-bearing sides, respectively, of said pair of rollers, for clamping against opposite faces of a workpiece and at the same time imparting forward motion to the workpiece, said work-transporting means defining a path of travel for a workpiece through the apparatus which lies in a plane perpendicular to the plane defined by said roller axes and which supports a workpiece so that a plane bisecting the workpiece bisects said zone between said sanding belts.

8. Dimensional sanding apparatus for a nonmetallic workpiece comprising a frame, a pair of substantially horizontal and parallel rollers, said rollers having rigid peripheries centered about the axes for the rollers, means mounting said rollers on said frame with one above the other and the axes of the rollers in a vertical plane, said means mounting said rollers supporting the rollers with their axes a fixed distance apart and with the peripheries of the rollers in spaced relationship, an endless sanding belt trained over each of the rollers, said rollers providing nonyielding backing for the two belts in a zone located between the rollers which constitutes a dimensional sizing and sanding zone in the apparatus, and work-transporting means on the feed and off-bearing sides, respectively, of said pair of rollers, for clamping against opposite faces of a workpiece and at the same time imparting forward motion to the workpiece, said work-transporting means defining a path of travel for a workpiece through the apparatus which lies in a plane perpendicular to the plane defined by said roller axes and which supports a workpiece so that a plane bisecting the workpiece bisects said zone between said sanding belts, each of said work-transporting means comprising two sets of opposed clamping rolls mounted on the frame with one set forwardly along said path of travel from the other set, said set of said clamping rolls being spaced apart from said other set a distance which is less than the length of a workpiece, and the sets of clamping rolls of the two work-transporting means which are directly on either side of said rollers which train the sanding belts being spaced apart a like distance, whereby a workpiece being sanded is at all times contacted by at least two sets of clamping rolls.

9. The apparatus of claim 8, wherein one set of ends of the various rolls in said sets of clamping rolls are adjustable, to vary the clamping pressure exerted by said one set of ends, for the purpose of properly directing a workpiece through the apparatus.

10. Dimensional sanding apparatus for a nonmetallic workpiece comprising a frame, a first pair of substantially horizontal and parallel rollers having rigid circumferential surfaces, means mounting said first pair of rollers on said frame with one roller directly above and spaced from the other, with the axes of the rollers defining a vertical plane, and a second pair of substantially horizontal and parallel rollers having rigid outer circumferential surfaces, means mounting said second pair of rollers on said frame with one roller of the pair directly above and spaced from the other, with the axes of the rollers defining a vertical plane, and said rollers of the second pair being spaced closer together than the rollers of the first pair, said second pair of rollers being mounted on the off-bearing side of said first pair of rollers, in a position where a common horizontal plane passing midway between the rollers of the first passes midway between the rollers of the second pair, and an endless sanding belt trained over each of said rollers, with the rollers of each pair providing nonyielding backing for the belt.

11. The sanding apparatus of claim 10, which further comprises work-transporting means on the feed side of said first pair of rollers, work-transporting means intermediate the first and second pair of rollers, and work-transporting means on the off-bearing side of said second pair of rollers, each of said work-transporting means comprising a pair of opposed clamping rolls mounted on said frame, said clamping rolls of the various work-transporting means defining a path of travel for a workpiece through the apparatus which lies in a plane perpendicular to the planes defined by said roller axes, and which supports a workpiece so that a plane bisecting the workpiece bisects the space between the rollers of each pair.

12. Dimensional sanding apparatus for a nonmetallic workpiece comprising a frame, a substantially horizontal first roller journaled on said frame, said first roller having a rigid circumferential surface, and being mounted with the axis thereof stationary, a drum mounted on said frame above said first roller with the axis thereof paralleling the axis of said first roller, an endless sanding belt trained over said roller and drum, a subframe mounted on said frame and adjustable vertically to place it in one of multiple stationary positions thereon, a substantially horizontal second roller journaled on said subframe directly below said first roller with the axis thereof substantially parallel to the axis of the said first roller, said second roller having a rigid circumferential surface, and being mounted on said surface with the axis thereof stationary, another drum journaled on said subframe below said second roller with the axis thereof paralleling the axis of said second roller, and endless sanding belt trained over said second roller and other drum, and means mounted on the apparatus for transporting a workpiece between said first and second rollers along a path which is perpendicular to the plane defined by the axes of said first and second rollers, with the workpiece on passing between said first and second rollers being contacted by the belts extending over these rollers.

References Cited by the Examiner

UNITED STATES PATENTS

| 258,553 | 5/1882 | Brown et al. | 51—140 |
| 2,244,536 | 6/1941 | Herchenrider | 51—326 |
| 3,169,352 | 2/1965 | Smith | 51—140 |

ROBERT C. RIORDON, *Primary Examiner.*

L. S. SELMAN, *Assistant Examiner.*